July 23, 1957 L. A. GOLDMUNTZ 2,800,562
CONTROL DEVICE FOR ELECTRIC HEATING ELEMENTS
Filed April 21, 1952
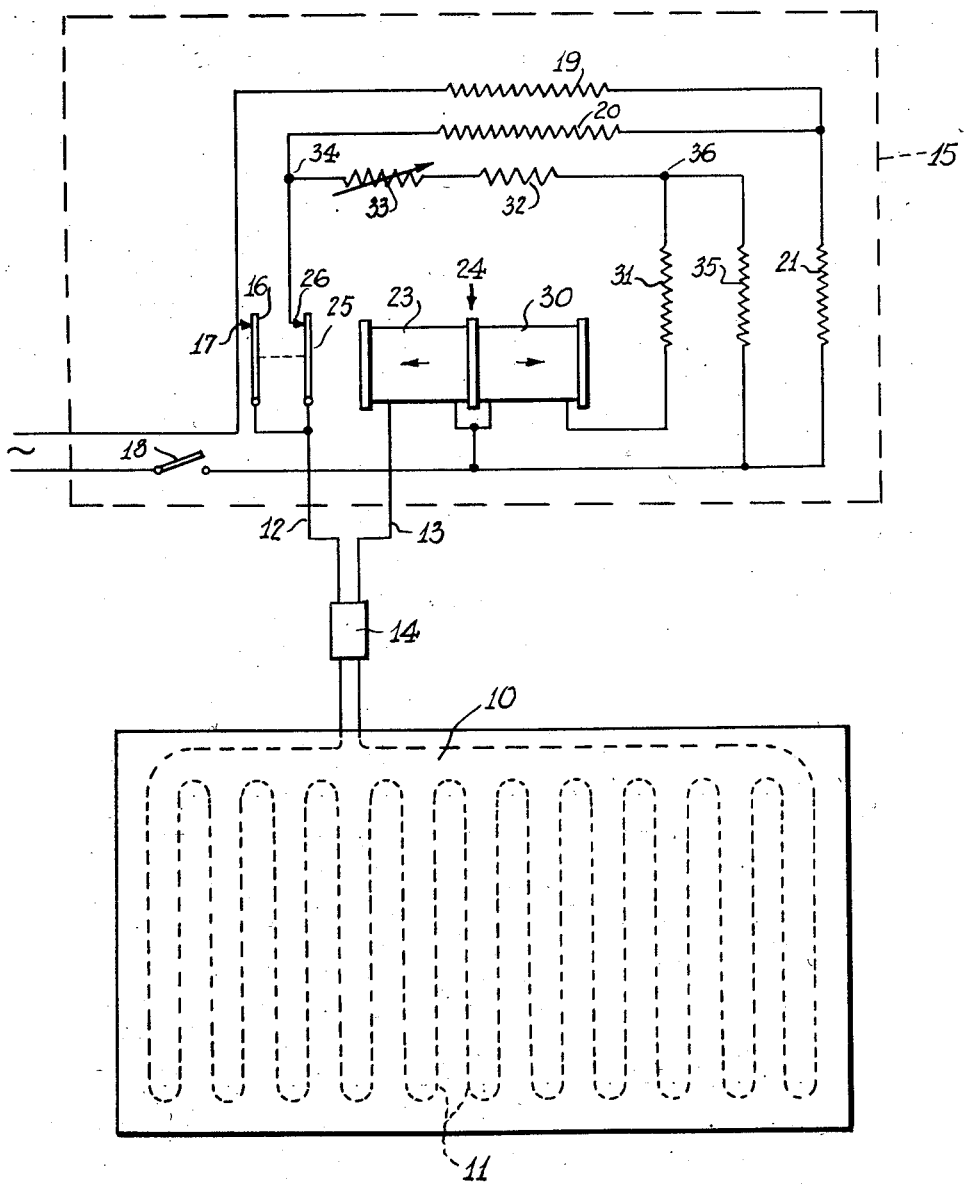
INVENTOR.
LAWRENCE A. GOLDMUNTZ
BY
ATTORNEY.

United States Patent Office 2,800,562
Patented July 23, 1957

2,800,562
CONTROL DEVICE FOR ELECTRIC HEATING ELEMENTS

Lawrence A. Goldmuntz, New York, N. Y., assignor to Bobrich Products Corp., New York, N. Y., a corporation of New Jersey Application April 21, 1952, Serial No. 283,399

5 Claims. (Cl. 219—20)

This invention relates to control systems for electric circuits and more particularly to control systems adapted to control the temperature of and protect such devices as electric blankets, electric heating pads, and the like.

While not limited thereto, the present invention has particular utility as a temperature control device for electric blankets and, therefore, shall be described, by way of example, with reference to such an article.

The conventional electric blanket comprises a fabric covering having woven or stitched channels through which are threaded electric heating conductors. These conductors are energized from a suitable source of supply and are arranged under control of a temperature controller to generate sufficient heat to maintain the unit at some desired temperature. The usual method of controlling blanket temperature is to employ a bimetallic switch which is thermally removed from the blanket and arranged to respond to the ambient temperature. As the ambient temperature falls it takes longer for the heater associated with the bimetallic switch to cause the normally closed switch to open and thus interrupt the blanket current. At the same time the off period is shortened with lower ambient temperature since the bimetallic element cools more rapidly. The result is that the blanket is supplied with more energy during a given time period and thus its temperature is elevated. This method, however, suffers from many disadvantages. Of prime importance is the disadvantage resulting from the controller operating entirely independent of the actual temperature of the blanket. With this arrangement, if the controller is placed near an open window or a radiator, it will cause the blanket to be either too warm or too cold, and naturally, the controller is totally incapable of compensating for changes in blanket temperature due to the blanket being covered with an additional blanket or the like.

One of the objects of the present invention is to maintain the blanket temperature, irrespective of ambient temperature, more closely to a desired average level than existing control devices.

The present invention accomplishes this purpose by measuring the blanket temperature, in terms of blanket resistance, and maintaining the temperature at the desired level in accordance therewith.

Another object of the invention is to provide a novel method for controlling the off-period of blanket current such that it varies directly with the ambient temperature.

A still further object of the invention is to employ a temperature responsive resistance to control the blanket current off-period.

Still another object of the invention is to provide a temperature control device which functions independent of fluctuations in the voltage of the source supplying current to the system.

A further object of the invention is to provide a unitary control device for maintaining the temperature of an electric blanket or the like at a desired level and for protecting said blanket or the like from overheating of all or a portion thereof.

The invention will be better understood from the following description when taken in connection with the accompanying drawing, the single figure of which diagrammatically illustrates an electric blanket temperature control system embodying the invention.

Referring now to the drawing, 10 represents a conventional electric blanket including a heating coil or element 11 which is arranged in a plurality of convolutions spread evenly throughout the blanket area to provide uniform heating. The heating element is shown connected by means of conductors 12 and 13 to the temperature control apparatus included within the dashed lines 15. It is to be understood that the conductors 12 and 13 may be provided with a suitable plug connection to render separable the blanket and controller.

The control circuit 15 includes a differential relay 24 comprising a current coil or winding 23 and a voltage coil 30. Current coil 23 has one terminal connected with conductor 13 for connection to the blanket heating element 11, while the other terminal of the coil is connected to a power switch 18 for connection to a source of power. Coil 30 has one terminal connected to switch 18 while the other terminal of this coil is connected through resistors 31, 32, and 33 in series to a junction point 34. Resistor 33 is variable as shown. Connected in parallel with the series arrangement of coil 30 and resistor 31 is a resistor 35. Resistor 35 is one which has a non-linear voltage characteristic. More specifically, the resistance of resistor 35 decreases as the voltage applied across its terminals increases. Differential relay 24 is provided with a pair of movable contacts or armatures 16 and 25 which are normally in engagement with stationary contacts 17 and 26, respectively. If desired, the pair of armatures 16 and 25 may be replaced by a single armature which can engage both contacts 17 and 26. Contact 17 is connected through a resistor 19 to the junction between two resistors, 20 and 21. Resistor 21 completes a circuit back to switch 18 while resistor 20 is connected to point 34, the latter being connected to relay contact 26. Resistor 20 is selected to have a negative temperature coefficient of resistivity. The two armatures 16 and 25 are connected together and to conductor 12 for connection with the opposite end of the blanket heater. Contact 17 of the relay and power switch 18, are provided with means for connecting them to a source of power for the system. If desired, a neon indicating lamp and resistor, or the like, may be connected between contact 17 and the relay side of switch 18 to indicate the position of the latter.

The temperature control device operates in the following manner. Before switch 18 is closed to supply current to the system, the blanket is cold and the resistance of the heating element 11 is at a minimum. Resistor 20 is also cold and its resistance, therefore, is at a maximum. Also, since relay 24 is deenergized, armatures 16 and 25 are in engagement with their respective contacts. Upon closing switch 18, current will flow from the source through relay winding 23, conductor 13, the blanket heating element 11, conductor 12, armature 16, and contact 17 back to the source. Current also flows through resistor 35 in parallel with winding 30 and resistor 31, then through resistors 32 and 33, contact 26, armature 25, armature 16, and contact 17 back to the source. Another current path is through resistor 21 and then through resistors 19 and 20 in parallel back to the source through the closed relay contacts.

Assuming for the moment a fixed supply voltage, the resistance of the circuit including winding 30 will have some fixed value determined by the choice of resistors 31, 32 and 35 and the setting of resistor 33. Thus winding 30 will develop a fixed amount of magnetic flux (in proportion to its ampere turns) which, due to its polarization, tends to attract armatures 16 and 25 and open their circuits. However, since the blanket resistance is at a minimum the current through winding 23 is at a maximum. Its polarization is such as to oppose the flux developed by winding 30 and the net magnetic flux (due to the net ampere turns) is insufficient to open the contacts of the relay. It should be noted that with the contacts closed the temperature responsive resistor 20 is connected between one side of the source of supply and a point on the voltage divider formed by resistors 19 and 21. Therefore, resistor 20 has a fixed potential applied across its terminals.

After a time, blanket 10 increases in temperature and the resistance of element 11 increases causing a decrease in the current flowing through winding 23. Eventually the resistance of element 11 will exceed some critical value where the net ampere turns of the relay 24 will be sufficient to open its associated contacts. The critical value corresponding to a pre-set blanket temperature can be adjusted by varying resistor 33 which alters the current flowing through winding 30. This current may be considered as a reference current against which the current through the blanket is compared. During the time that the blanket was energized, resistor 20 was also energized and it, therefore, heats in direct proportion to the on-time of the blanket.

When the blanket has reached the selected temperature and relay 24 operates, the following takes place. Armatures 16 and 25 are attracted from their respective contacts and, therefore, the circuit including the blanket element 11 and the relay winding 23 is interrupted. The blanket, naturally, commences to cool. However, relay winding 30 is still energized through the circuit including resistors 31, 32, 33, 20 and 19. The addition of resistors 19 and 20 in series with winding 30 causes a reduction in the current flowing therethrough. But it should be remembered that resistor 20 is now hot and, therefore, its resistance is at a low value. The circuit is arranged so that in the absence of current through winding 23, the current through winding 30, when resistor 20 is hot, will be sufficient to maintain the relay contacts open. Resistor 20 as well as the other components of the control circuit are located remote from the blanket and subject to cooling from the surrounding air. The current through resistor 20 is decreased as set forth above and, therefore, the resistor now cools in accordance with the ambient temperature. As it cools its resistance gradually increases and thus the current flowing through it to winding 30 will decrease. Soon a point is reached beyond which the flux produced by winding 30 can no longer maintain the relay contacts open and they re-close. This restores the original circuit connections and the blanket begins to heat up again until it reaches the desired pre-set temperature whereupon it is shut off for a period proportional to the ambient temperature, that is, the higher the ambient temperature the longer the off-period.

As with most standby control devices, it is desirable that the device per se consume as little power as possible. For efficient operation most of the power utilized should be converted to heat in the blanket. To this end winding 23 which is in series with the blanket should have a low impedance and, therefore, is chosen with relatively few turns. On the other hand, winding 30 is in parallel with the blanket and, therefore, it should be constructed with relatively many turns and have high impedance.

Up to now, it has been assumed that the supply voltage has remained constant. This, however, is not attainable in practice and, therefore, the ideal controller should be designed to operate irrespective of voltage fluctuations. Considering the instant device, it should be apparent that the relay operates only when the magnetic flux or net number of ampere turns has reached a given level. In accordance with the operation set forth above, the net number of ampere turns is equal to the number of ampere turns on the voltage coil 30, minus the number of ampere turns on the current coil 23. This can be represented by the following equation.

$$K = N_v I_v - N_c I_c \qquad (1)$$

where:

$K$ = net number of ampere turns,
$N_v$ = number of turns on the voltage coil,
$N_c$ = number of turns on the current coil,
$I_v$ = current through the voltage coil, and
$I_c$ = current through the current coil.

Neglecting resistor 35 for the moment, it should be apparent that the currents through each of the relay windings vary in proportion to variations in the line voltage. For the reasons set forth above $N_v$ will be greater than $N_c$. Therefore, $K$ will vary with line voltage fluctuations, an increase thereof causing the relay to operate. Hence, neglecting resistor 35, the control would interpret an increased line voltage as an increase in blanket temperature.

Now considering resistor 35, whose resistance decreases as the voltage applied across its terminals increases, it is seen that it shunts voltage coil 30 and resistor 31 more effectively with increase in voltage so that the voltage coil current, $I_v$, no longer increases proportionately. Naturally, the converse is also true, as the voltage decreases, the shunting caused by resistor 35 is less effective. By the proper choice of resistors 31, 32, 33 and 35, it is possible to maintain $K$ substantially constant with fluctuations in line voltage. If we assume that the line voltage changes by X% then we must satisfy the following equation if $K$ is to remain constant.

$$\Delta I_v = \frac{N_c}{N_v} \cdot \frac{X}{100} \cdot I_c \qquad (2)$$

However, we also have the relation:

$$\Delta I_v = \frac{dI_v}{dV} \Delta V \qquad (3)$$

where:

$I_v$ = change in voltage coil current,
$\Delta V$ = change in line voltage, and
$V$ = line voltage.

Solving the equations applicable to the circuit it can be shown that:

$$\frac{dI_v}{dV} = \frac{A}{R_b R_a + A(R_a R_b)} \qquad (4)$$

where:

$$A = \frac{L\left(\frac{H}{A_r}\right)^{\frac{1}{N+1}}}{N+1} \left[\frac{V - I_v(R_a + R_b)}{R_b}\right]^{\frac{-N}{N+1}} \qquad (5)$$

and $R_b$ = the sum of the resistances of resistors 32 and 33,
$R_a$ = the sum of the resistance of winding 30 and resistor 31,
$L$ = length of voltage sensitive resistor 35 in centimeters,
$H$ = constant pertaining to resistivity of resistor 35,
$N$ = exponent connecting resistance of resistor 35 with its voltage gradient, and
$A_r$ = cross-sectional area of the resistor 35.

If we combine Equations 2, 3 and 4 we get the following:

$$\frac{N_c}{N_v} \cdot \frac{X}{100} \cdot I_c = \frac{A}{R_b R_a + A(R_a + R_b)} \Delta V \qquad (6)$$

Therefore to maintain the circuit insensitive to voltage fluctuations of X% we must choose the circuit constants so as to satisfy Equation 6.

Although the circuit has been described in terms of a voltage sensitive resistor, it should be understood that it will function equally well using a gas discharge tube or any other voltage sensitive element.

The reason for including resistor 32 in series with variable resistor 33 should now be obvious. In order for resistor 35 to influence the current flowing through winding 30, it is necessary that some impedance be present between points 34 and 36. Therefore, resistor 32 has been included to fix the minimum resistance between the above two points. The relative sizes of resistors 33 and 32 are determined by the sensitivity desired from the temperature adjustment control resistor 33. Depending upon the constants of resistor 35, resistor 31 may be eliminated.

If desired, resistor 31 or 32 may have a negative temperature coefficient of resistance with a suitable characteristic such that it will compensate for the positive temperature coefficient of resistance of the copper wire usually used to wind coil 30 of relay 24. This means that the control setting is held constant regardless of ambient temperature conditions and regardless of the length of time the control has been turned on.

It should be noted that the instant circuit provides overheat protection as well as heat control. Under normal operation the entire blanket and, therefore, the entire heater element heats uniformally and is turned off periodically when it obtains the desired maximum temperature. This temperature corresponds to a fixed blanket resistance. However, the same change in resistance can be brought about by excessively heating a small area of the blanket. With the instant apparatus, it is possible to interrupt the current if approximately 2% or more of the blanket area is raised to the scorch point. This is true when the difference between the maximum and minimum temperatures during cycling of the control devices is made equal to about 3° C.

It will thus be seen that the invention provides a very simple temperature control and overheat protection device which functions independent of supply voltage fluctuations.

While only one embodiment of the invention has been shown and described, it will be understood that minor changes in the construction, combination, and arrangement of parts may be made without departing from the spirit and scope of the invention as claimed.

Having thus described the invention, what is claimed is:

1. A temperature control device for a resistive heating element comprising first and second terminals for connection to said heating element, third and fourth terminals for connection to a source of power, a differential relay having a first and a second winding and at least two pairs of relay contacts, said first winding being connected between said first and third terminals so as to be in series with said heating element, said second winding being connected at one end to said third terminal and having its other end connected through a first pair of said relay contacts to said second terminal, said second terminal being connected through a second pair of said relay contacts with said fourth terminal whereby when said pairs of contacts are engaged, said second winding is connected so as to be in parallel with said first winding and said heating element in series, said windings being arranged in opposed and normally balanced relation for controlling the energization of the heating element, said windings assuming an unbalanced relation to effect opening of the relay contacts upon heating of the heating element to a pre-set temperature, a voltage divider connected between said third and fourth terminals, and a temperature sensitive impedance connected at one end to an intermediate point on said voltage divider and at the other end to the said other end of said second winding whereby said temperature sensitive impedance and said heating element are heated separately and concurrently in direct proportion when said pairs of contacts are engaged and said temperature sensitive impedance is connected in series with said second winding to alter the current therethrough when said relay contacts are open to restore balance to said windings upon cooling of said impedance a predetermined amount.

2. A temperature control device according to claim 1, further comprising a second voltage divider included in the connection between said second winding and said first pair of relay contacts, said other end of the temperature sensitive impedance being connected to the junction between said first pair of relay contacts and said second voltage divider, and a voltage sensitive impedance connected between said third terminal and a point on said second voltage divider spaced from said junction whereby operation of said relay is rendered insensitive to fluctuations in the voltage of said source.

3. A temperature control device according to claim 2, wherein at least a part of said second voltage divider comprises an element having a negative temperature coefficient of resistance.

4. A temperature control device according to claim 1, further comprising a linear resistor included in the connection between said second winding and said first pair of relay contacts, said other end of the temperature sensitive impedance being connected to the junction between said first pair of relay contacts and said linear resistor, and a voltage sensitive impedance connected in parallel with said second winding whereby operation of said relay is rendered insensitive to fluctuations in the voltage of said source.

5. A temperature control device for a resistive heating element whose resistance varies with temperature, comprising first and second terminals for connection to said heating element, third and fourth terminals for connection to a source of power, a differential relay having a first and a second winding, said first winding being connected between said first and third terminals so as to be in series with said heating element, said second winding being connected at one end to said third terminal and having its other end connected through first and second resistors in series to said fourth terminal, said first resistor having a temperature coefficient of resistivity opposite in sign to that of said heating element, a third resistor connected between said third terminal and the junction between said first and second resistors, and a plurality of differential relay contacts operative only when said relay is in its normal position to interconnect the remote ends of said first and second resistors and join said second terminal to said fourth terminal, whereby when said relay is in its normal position said first and third resistors are connected to be energized in series from said source of power for heating said first resistor and said second winding is connected in opposed and normally balanced relationship with respect to said first winding for controlling the energization of the heating element, said windings assuming an unbalanced relation to effect opening of the relay contacts upon heating of the heating element to a pre-set temperature, opening of said relay contacts placing said first resistor effectively in series with said second winding to alter the current therethrough for restoring balance to said windings upon cooling of said first resistor a predetermined amount.

References Cited in the file of this patent

UNITED STATES PATENTS

| 919,402 | Trumpler | Apr. 27, 1909 |
| 1,183,814 | Haagn | May 16, 1916 |
| 1,225,388 | Woodbridge | May 8, 1917 |
| 1,276,589 | Steinmetz | Aug. 20, 1918 |
| 1,528,053 | Hands | Mar. 3, 1925 |
| 1,550,155 | Fitzgerald | Aug. 18, 1925 |
| 2,057,902 | Moreau | Oct. 20, 1936 |
| 2,339,635 | Hall | Jan. 18, 1944 |
| 2,429,827 | Lamm | Oct. 28, 1947 |
| 2,477,819 | Newell | Aug. 2, 1949 |
| 2,510,041 | Rudahl | May 30, 1950 |
| 2,546,926 | Hart | Mar. 27, 1951 |
| 2,549,095 | Huck | Apr. 17, 1951 |
| 2,592,525 | Huck | Apr. 15, 1952 |
| 2,632,086 | Hagen | Mar. 17, 1953 |
| 2,709,216 | Moran et al. | May 24, 1955 |

OTHER REFERENCES

McNairy: Abstract of application No. 725,852, published April 11, 1950.